US005567111A

United States Patent [19]

Gearin et al.

[11] Patent Number: 5,567,111
[45] Date of Patent: Oct. 22, 1996

[54] METHOD FOR HANDLING AND TRANSPORTING WHEELED VEHICLES

[75] Inventors: Peter Gearin; David J. Miller, both of Portland, Oreg.

[73] Assignee: G & G Intellectual Properties, Inc., Portland, Oreg.

[21] Appl. No.: 175,281

[22] Filed: Dec. 28, 1993

[51] Int. Cl.$^6$ .................................................. B60P 3/08
[52] U.S. Cl. .............................. 414/786; 410/16; 410/26; 410/9; 410/13; 414/498
[58] Field of Search ................................. 414/498, 228, 414/229, 234, 426, 786; 410/7–11, 13, 15, 16, 19, 24–26, 30, 45

[56] References Cited

U.S. PATENT DOCUMENTS

| 1,996,695 | 4/1935 | Bigley, Jr. ............................. 280/144 |
| 2,503,138 | 4/1950 | Smith ..................................... 414/426 |
| 2,617,368 | 11/1952 | McCormick ........................... 105/368 |
| 3,511,392 | 5/1970 | Blunden et al. ..................... 410/24 X |
| 3,611,949 | 10/1971 | Peisner ................................... 410/10 |
| 3,618,796 | 11/1971 | Peisner ............................. 414/498 X |
| 3,667,635 | 6/1972 | Hackney ............................... 214/515 |
| 3,675,795 | 7/1972 | Dluhy .................................. 214/16.1 |
| 4,455,119 | 6/1984 | Smith ..................................... 414/537 |
| 4,759,668 | 7/1988 | Larsen et al. ..................... 410/24 X |
| 4,768,916 | 9/1988 | Gearin et al. ......................... 414/498 |
| 4,789,281 | 12/1988 | Westerdale .......................... 410/29.1 |
| 4,801,229 | 1/1989 | Hanada et al. ....................... 410/26 |
| 4,834,608 | 5/1989 | Middaugh et al. ................. 410/8 X |
| 4,917,557 | 4/1990 | Kato et al. .......................... 414/229 |
| 5,071,298 | 12/1991 | Conzett .............................. 410/25 X |
| 5,106,246 | 4/1992 | Chance ................................. 410/26 |
| 5,110,242 | 5/1992 | Chance ................................. 410/26 |
| 5,110,250 | 5/1992 | Kuo ..................................... 414/229 |
| 5,213,458 | 5/1993 | Preller et al. ........................ 410/26 |
| 5,253,975 | 10/1993 | Takaguchi ...................... 414/498 X |
| 5,336,031 | 8/1994 | Golan ................................ 414/229 |
| 5,344,266 | 9/1994 | Kolb .................................... 410/26 |

FOREIGN PATENT DOCUMENTS

| 46-15524 | 4/1971 | Japan . |
| 61-115744 | 6/1986 | Japan . |
| 827210 | 2/1960 | United Kingdom . |
| 1580706 | 12/1980 | United Kingdom . |
| 2050304 | 1/1981 | United Kingdom . |

Primary Examiner—Karen B. Merritt
Assistant Examiner—Stephen Gordon
Attorney, Agent, or Firm—Chernoff, Vilhauer, McClung & Stenzel

[57] ABSTRACT

Apparatus for supporting automobiles, including racks each capable of carrying two automobiles, one above the other, particularly in intermodal cargo containers, and a method for use of the apparatus. Each rack includes wheels on which the rack is supported for movement when it is in a collapsed configuration, for insertion of the rack into a cargo container. A pair of wheeled cradles carries an automobile by supporting its wheels. One pair of such cradles is supported by an upper pair of longitudinal beams which are each supported by a pivot connection to a collapsible upright at one end and by an upright strut spaced apart from that end. Another pair of cradles is fastened in a selected location to a pair of horizontal lower longitudinal support members of the rack, to hold the second automobile in a desired position beneath the first. In its collapsed configuration the rack is very low, enabling several empty racks to be carried in a single cargo container.

16 Claims, 10 Drawing Sheets

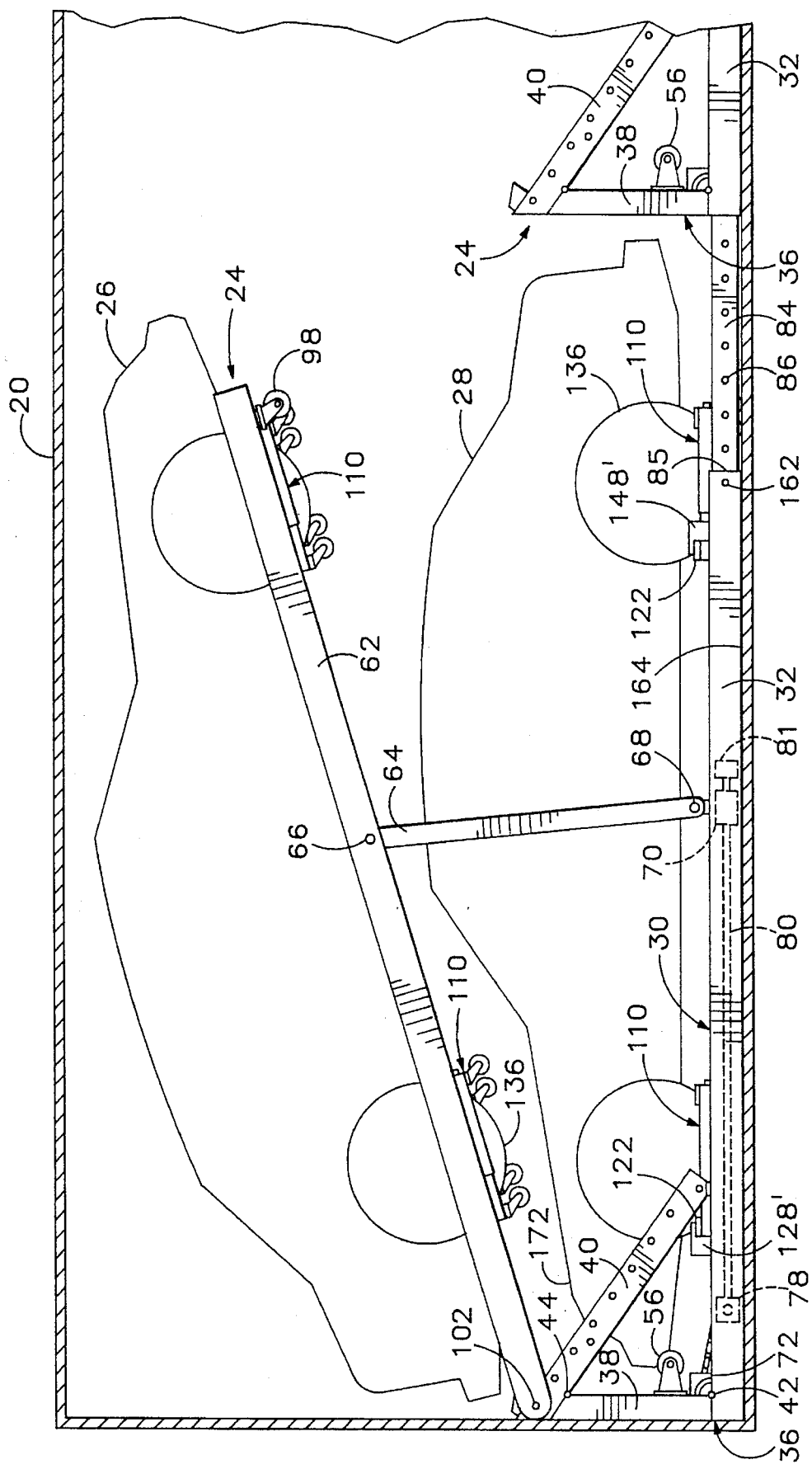

METHOD FOR HANDLING AND TRANSPORTING WHEELED VEHICLES

BACKGROUND OF THE INVENTION

The present invention relates to transport of wheeled vehicles, and in particular concerns carrying racks and their use for supporting motor vehicles, to efficiently utilize a limited amount of available space, such as the space available within an intermodal cargo container.

Use of standard intermodal cargo containers has become the preferred way to transport pilferable or easily damaged cargo over long distances, particularly where the transport involves carriage both by sea and over land. It is also known to place automobiles on racks which are carried inside cargo containers.

Because the width of automobiles is only slightly less than the width of the available space within a container it is very difficult for a person to maneuver automobiles under their own power within a container to effect loading and unloading, and there is a risk of damaging an automobile while entering or leaving the vehicle within a container. Accordingly, various racks have been devised to carry automobiles into and out from containers and to support them securely immobilized one above another within a container, in order to efficiently utilize the space available within a container.

One previously known arrangement is described, for example, in Preller et al. U.S. Pat. No. 5,213,458, which discloses an apparatus for supporting automobiles in two tiers within containers. The apparatus includes a dunnage device for keeping the system properly stabilized longitudinally within a container, but insertion of such apparatus into a container is more difficult than is desirable, since the supporting apparatus has to be skidded into place in a cargo container. Automobiles have to be driven up an incline to the position for transport, and the apparatus requires a forklift to raise an upper tier portion into place.

Gearin et al. U.S. Pat. No. 4,768,916 discloses an automobile carriage rack which requires automobiles to be placed in the rack prior to insertion of the rack into a container. The apparatus requires the use of lifting devices such as gantry cranes to raise automobiles into desired positions while the carriage rack remains outside the cargo container, and to lower the automobiles for removal at the destination. Because the loaded rack must be inserted through the doorway provided in an end of a container, space in the container above the height of the top of the doorway of the container remains unused.

Kato et al. U.S. Pat. No. 4,917,557 discloses a two-tier rack equipped with a pair of wheels at one end, to carry one end of the rack while it is moved by raising the other end. The rack must be loaded with automobiles prior to insertion into a cargo container, and the upper storage tier support portion of the rack is raised to an inclined position by merely pivoting it about an axis located low at one end of the device. A significant amount of space within a container may be wasted, because vehicles carried on the rack are not directly above one another, requiring the rack to therefore be significantly longer than the longest vehicle which can be carried upon it. Also, because one end of the rack must be raised to maneuver the rack into a container, available interior space above a height somewhat lower than the container doorway is not useable because of the clearance needed.

Dluhy U.S. Pat. No. 3,675,795 discloses a tiltable rack for supporting an individual automobile. A pair of legs hold one end of the rack in a raised position within a container so that several automobiles on such racks may be carried within a container with one overlapping another longitudinally. The device requires use of a lift device, however, to carry one end of the rack as it is moved into the container, and dunnage is required behind the support legs of the last such rack placed into the container.

Spier et al., U.K. patent application GB 2050304 discloses an automobile-supporting apparatus which is placed within a cargo container empty. After a first automobile is placed on the device, one end of the automobile is raised by lifting a pair of arms which pivot about an axis located at the other end of the device. However, when the movable arms are in their lowered position, the rack is taller than desired, thus occupying an unnecessarily large volume during return shipment of the empty rack. Also, the height of the device requires a vehicle's wheels to be replaced by special rings to obtain vertical clearance for placement of the automobiles. This adds cost and labor which it is desirable to avoid.

Smith U.S. Pat. No. 4,455,119 discloses a specially-equipped automobile-carrying trailer including wheel-guiding tracks along which transversely-oriented bars are adjustably movable longitudinally of the tracks to provide a longitudinal space between a pair of the bars. The device receives a tire between the bars and thus holds the vehicle in place longitudinally along the channels. The automobiles must be driven into the trailer, however, and so there is the risk of damage to the automobiles.

McCormick U.S. Pat. No. 2,617,368 discloses an automobile-carrying railroad car incorporating rack-and-pinon apparatus for independently raising the opposite ends of a rack supporting a first automobile, to provide space beneath the raised automobile for a second automobile. The lift apparatus, however, is apparently not easily removable from a railroad car in which it is installed, and would therefore interfere with use of the same car for other types of cargo.

A special automobile-carrying rack disclosed by J. B. Hunt Company apparently must be placed in position within a container while empty and utilizes a separate cradle to support both tires on a respective end of an automobile. Each cradle is supported by a hanger assembly at each side of the rack, and each hangar assembly is attached to a post including a mechanical lift device to raise the hangers. A coordinated drive arrangement provides for raising the hangers and cradle supporting one end of the automobile twice as far as those at the other end of the automobile, providing space for a second automobile to be driven into place beneath the first. The automobiles must be steered into the rack on their own wheels, however, and it is difficult to exit from the automobiles once they are in position. An adjustable portion of the frame may be extended to prevent a subsequent frame from approaching a first frame too closely.

It is known to place vehicles onto the deck of a flatbed truck for transport by tilting the deck rearward, and then translating the deck rearward and downward in the direction of its slope, until its rear end reaches the ground. Thereafter a vehicle is moved up the inclined deck and fastened to the deck. The deck is then translated forward and upward along the direction of its slope, and finally the deck is tilted forward to resume a level orientation. Such a procedure, however, is undesirably complex and hazardous for raising a vehicle into a position for carriage within a container.

Prior art apparatus and methods for supporting automobiles within intermodal cargo containers, then, have presented difficulties in use, have left available space unusable within containers, have required unnecessarily large volumes for return transport of empty apparatus, and often require special equipment for loading and unloading.

What is needed, then, is an improved apparatus for supporting wheeled vehicles, and a method for use of such apparatus, which enables a maximum number of wheeled vehicles to be transported within an intermodal cargo container, which permits the entire internal height of a cargo container to be used without limitation by the height of the doorway at an end of such a container, which allows vehicles to be loaded into or unloaded from the container easily without special facilities, and which is itself easily inserted into a container, yet which rests securely on the floor of the container once located within the container. Such a vehicle-supporting apparatus should also be collapsible to occupy a minimum amount of space, so that container volume is not wasted in return shipment of empty apparatus, and so that a large proportion of containers used to ship vehicles in one direction can be used for shipment of other cargo in the opposite direction.

SUMMARY OF THE INVENTION

The present invention overcomes the disadvantages and shortcomings of the prior art methods and apparatus for transport of automobiles and supplies an answer to the aforementioned needs by providing an improved vehicle-supporting apparatus and a method for its use for carrying wheeled vehicles such as automobiles within a limited amount of space, such as that available within an intermodal cargo container.

The present invention provides a system of collapsible racks, each of which supports two automobiles one above the other. Each rack is convertible to a collapsed configuration and is easily inserted into a container in such a configuration, after which the rack is erected and automobiles are placed on the rack for transport.

According to the method of the invention, a rack is moved along a generally planar substantially horizontal surface to a desired location, such as inside a cargo container, where the rack is placed into a vehicle-receiving configuration. Next, a wheeled vehicle such as an automobile is moved along the generally planar substantially horizontal surface into a required position with respect to the rack, supported on a cradle which has its own wheels and supports one or more wheels of the vehicle, and the cradle is then connected to the rack. A first wheeled vehicle is moved to an upper tier position by raising a part of the rack and thus raising the cradle or cradles supporting the vehicle, providing space for a second wheeled vehicle beneath the first.

In one embodiment of the present invention a set of wheels support the rack when it is in its lowered configuration, but when the rack is erected to support automobiles the wheels are raised, lowering the rack so that it is prevented by friction from moving about, as on the floor of a cargo container.

According to one aspect of the present invention the apparatus includes a mechanism for raising a wheeled vehicle to an upper tier position by raising first one end of an upper portion of the rack and then the other end of the upper portion of the rack to create space for a second automobile to be placed on the rack beneath the first one.

The apparatus of the invention includes easily used wheeled cradles which support the wheels of each wheeled vehicle, such as an automobile, and thus carry the automobile to a required position with respect to the rack, where the cradles are engaged with the rack to hold the automobile in the required position with respect to the rack.

In one embodiment of the invention the rack includes an adjustable longitudinal extension so that when the racks are placed within a cargo container the length of one or more of the racks can be adjusted to prevent movement of the racks longitudinally within the container.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 16 is a view similar to that of FIG. 15, showing the vehicle-supporting apparatus of the invention with two vehicles held in position for carriage in the container, and with a second vehicle-supporting apparatus according to the invention located within the container adjacent the first one.

DETAILED DESCRIPTION OF THE INVENTION

Figure 1:
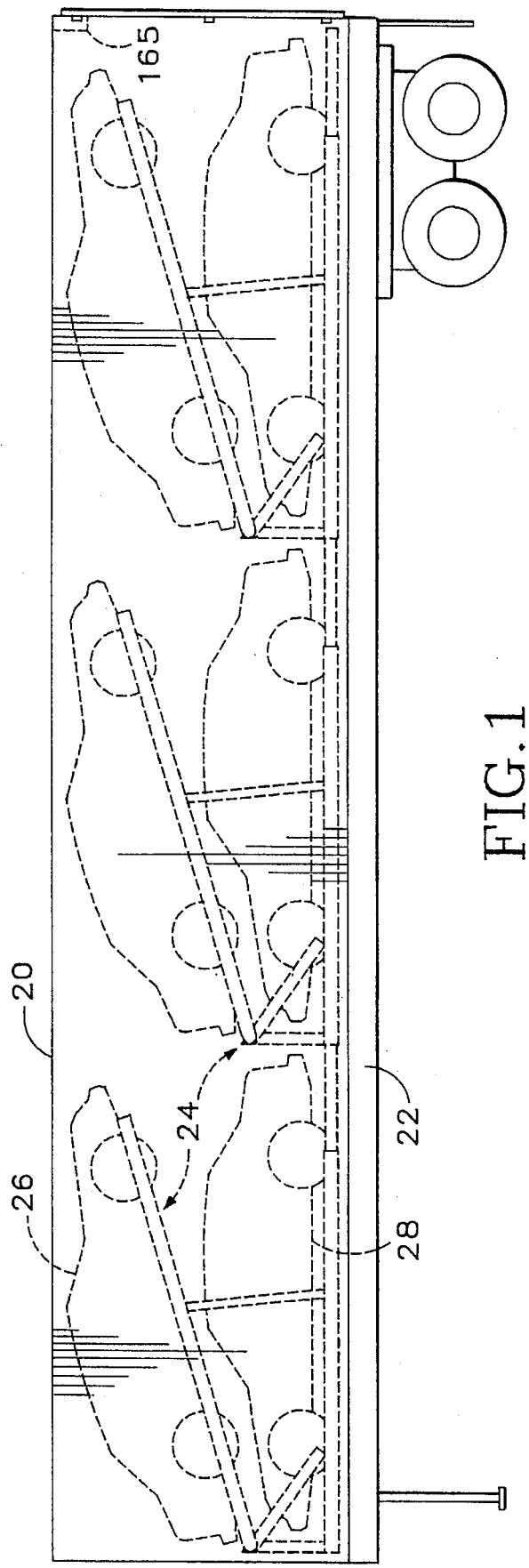
FIG. 1 is a side elevational view of a cargo container, mounted on a semi-trailer chassis and filled with automobiles carried upon vehicle-supporting apparatus according to the present invention.

Referring now to the drawings which form a part of the disclosure herein, in FIG. 1 an intermodal cargo container 20 is shown attached to a semi-trailer chassis 22. Within the container 20 are three vehicle-supporting racks 24 embodying the present invention, each supporting an automobile 26 in an upper-tier position and an automobile 28 in a lower-tier position beneath the automobile 26.

As may be seen in FIGS. 2–5, each rack 24 has a base 30 of welded construction including a pair of parallel horizontal base longitudinal members 32 interconnected and held parallel with each other by a pair of transverse members 34. Both the base longitudinal members 32 and the transverse members 34 may be of suitably strong square steel tubing, for example.

At a front end 36 of the rack are a pair of collapsible upright support subassemblies, each including a short upright support member 38 and an inclined support member 40. The upright members 38 may, like the members of the base 30, be of tubular steel. Each upright member 38 is attached to one of the base longitudinal members 32 by a respective hinge 42, while each inclined support member 40 is connected to the upper end of the respective upright member 38 by a hinge 44. The lower end of each inclined member 40 is attached to the top of the respective base longitudinal member 32 removably, as by a pin 45 extending through holes 46 defined in the inclined member 40 and a corresponding hole 48 defined by an upstanding ear 50 welded to the top of the base longitudinal member 32.

A stop 52 is mounted on each of the inclined members 40 in a selected position where it is held by a pin extending into a selected one of a plurality of holes 54 defined in the top face of the inclined member 40.

A wheel 56 is mounted rotatably on a pedestal 58 mounted on each upright member 38. Each base longitudinal member 32 defines a pair of openings 60 located one above the other adjacent the hinge 42, to define a passageway within which the pedestal 58 and wheel 56 can extend downwardly through the longitudinal member 32 as will be explained presently.

A pair of upper longitudinal vehicle support members 62 may be of steel in the form of an inverted U-shaped channel. Each of the upper longitudinal vehicle support members 62 is located above a respective one of the base longitudinal members 32, to which it is connected by a respective movable strut 64 having adequate columnar strength to support a substantial portion of the weight of a wheeled vehicle 26 of the type intended to be carried.

A first, or upper, end of each strut 64 is connected to the respective upper longitudinal vehicle support member 62 by a pivot joint 66, located at a fixed position along the length of the respective upper longitudinal vehicle support member 62. The other, or lower, end of each strut 64 is attached to the corresponding base longitudinal member 32 through a respective pivot joint 68 which is part of a movable bearing assembly 70 slidable along the interior surfaces of the respective base longitudinal member 32.

A drive transmission 72, which preferably includes a reduction gear assembly, has an output shaft with a sprocket 74 mounted thereon. The sprocket 74 is connected through an endless chain to drive a sprocket mounted drivingly on a shaft 76 which extends transversely of the rack 24 to a respective bevel gear set 78 located in each base longitudinal member 32 near the front end 36. From each of the bevel gear sets 78 a respective helically threaded shaft 80 extends rearwardly within the base longitudinal member 32. Preferably, the threaded shafts 80 are alike, and the bevel gear sets 78 are arranged so that both of the threaded shafts 80 rotate in the same direction and at the same speed in response to rotation of the shaft 76. A bearing 81 may be provided at the rear end of each threaded shaft 80 to receive axial and radial loads from the threaded shaft 80.

Figure 5:
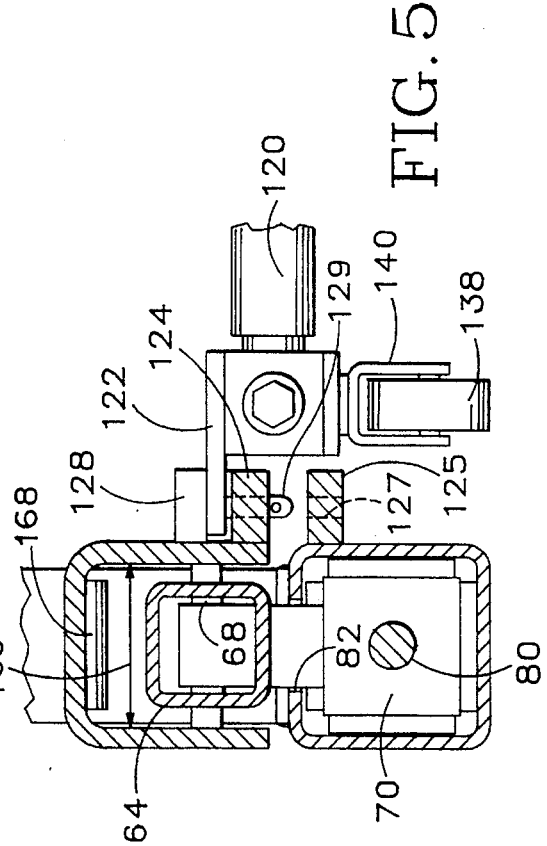
FIG. 5 is a section view taken along line 5—5 of FIG. 2, at an enlarged scale, showing the longitudinal members of one side of the apparatus, together with a portion of one of the wheeled cradles.

Each of the threaded shafts 80 is rotatably mated with helical threads defined within the respective movable bearing assembly 70, so that rotation of the threaded shaft 80 causes movement of the bearing assembly 70 longitudinally along the shaft 80 and thus along the respective base longitudinal member 32. Accordingly, as shown in FIG. 5, an elongated slot 82 is defined in the top of each of the base longitudinal members 32, and a portion of the movable bearing assembly 70 extends upward through the slot 82 to the pivot joint 68.

At the rear end 83 of the rack 24, a respective longitudinal base extension member 84 of tubular steel structure, for example, is adjustably disposed within the rear end 85 of each of the base longitudinal members 32 and includes several locating holes 86 spaced apart longitudinally.

A rear wheel 98 is mounted for rotation as part of a caster assembly 100 mounted on the bottom of each upper longitudinal vehicle support member 62, adjacent the rear end 83 of the rack 24.

At the front end of each of the upper longitudinal vehicle support members 62 is a transversely oriented locking pin 102. Each locking pin 102 is selectively retractable by a respective solenoid assembly 104 including a spring (not shown) which normally keeps the pin 102 extended. A control switch and wiring (not shown) selectively provide electrical current by which the solenoid assemblies 104 may be actuated by remote control to retract the locking pins 102.

At least a front end portion of each upper longitudinal vehicle support member 62 is of downwardly open construction, such as the inverted U-shaped channel previously mentioned. The inclined member 40 is narrower than the interior width 106 of the front end portion of each upper longitudinal vehicle support member 62, so that the front end portion of each can straddle the respective inclined member 40. Several transverse holes 108 extend through each inclined member 40, at corresponding locations on both of the inclined members 40, to receive the locking pins 102 in a selected pair of such holes 108 when the upper longitudinal vehicle support members 62 are raised to support a vehicle 26 in the raised, upper tier position shown in FIG. 1.

Figure 2:
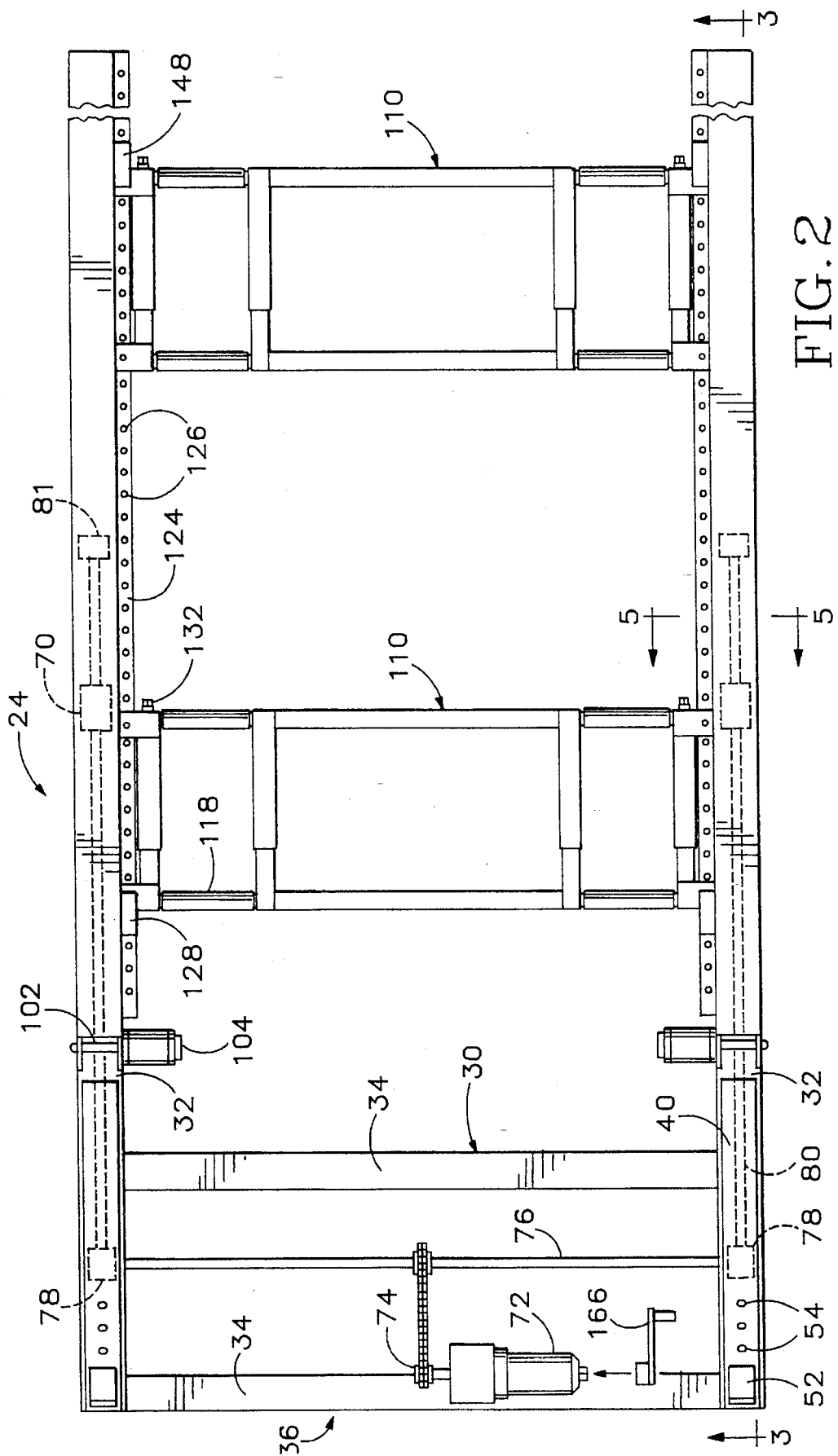
FIG. 2 is a top plan view of a vehicle-supporting rack apparatus of the type shown in FIG. 1, together with a pair of wheeled cradles used for supporting a vehicle on the rack and during movement to and from the rack.
Figure 4:
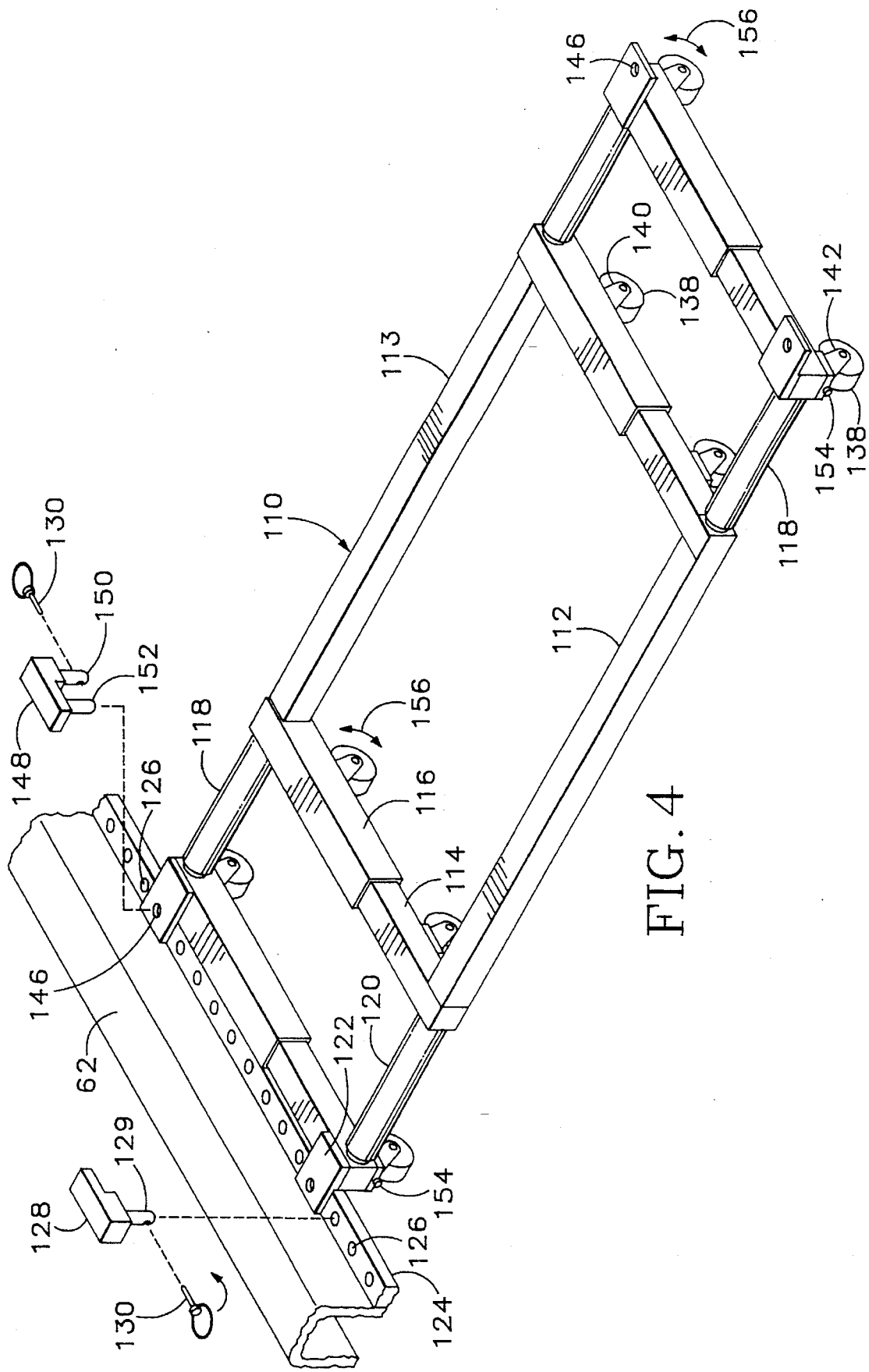
FIG. 4 is a perspective view of a wheeled cradle for supporting one end of a vehicle, together with a portion of one of the pair of upper longitudinal support members which are a part of the apparatus of the present invention.
Figure 6:
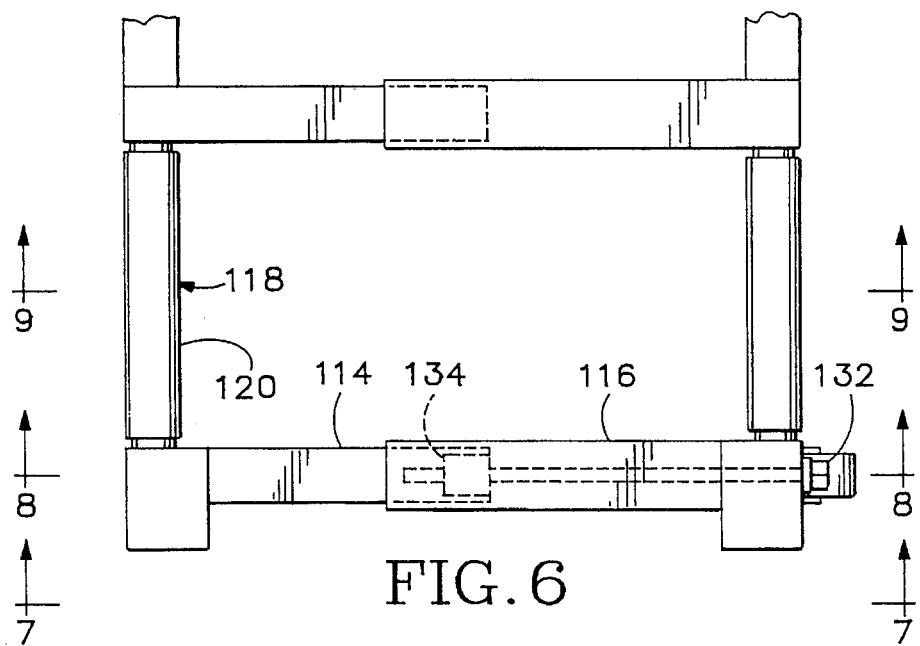
FIG. 6 is a top plan view of a portion of one of the wheeled cradles shown in FIGS. 2 and 4.

As shown in FIGS. 2 and 4, two wheeled cradles 110 of metal construction extend between and are supported by the upper longitudinal vehicle support members 62. Another pair of wheeled cradles 110 are also provided for use in association with the base longitudinal members 32. Each wheeled cradle 110 has a body which extends transversely of the rack 24 and has front and rear subassemblies respectively including transverse members 112 and 113 interconnected by telescopically mated front longitudinal members 114 and rear longitudinal members 116. Each of the transverse members 112 and 113 includes two tire engaging members 118, one located near each end of the wheeled cradle 110. Each tire engaging member 118 preferably includes an easily rotatable sleeve 120, which may be of a tough synthetic plastic material, disposed around a cylindrical strength member which is a part of the respective transverse member 112 or 113.

At each corner of the wheeled cradle 110 a respective support bracket 122 extends horizontally outward, in a lateral direction with respect to the rack 24, overlapping a respective longitudinally extending, inwardly-projecting flange 124 welded or otherwise securely attached to, and extending over most of the length of, each of the upper longitudinal vehicle support members 62. Regularly spaced-apart locator holes 126 are defined in both flanges 124, preferably along their entire lengths, and in corresponding opposite positions along the upper longitudinal vehicle support members 62.

A similar flange 125 is attached to the inner face of each of the base longitudinal members 32. Locator holes 127 are similar to the locator holes 126 on the flanges 124 and are similarly spaced apart from one another along the flange 125.

A movable front stop 128 includes a hold-down flange extending above the support bracket 122 and also has a pin 129 to be received in an appropriate one of the locator holes 126. A locking pin 130 removably engaged in the pin 129 of the front stop 128 keeps the pin 129 in the hole 126 until removal is desired. As shown in FIG. 4, the locking pin 130 may, for example, have a spring-loaded movable bail to keep it engaged in the pin 129.

As shown more clearly in FIGS. 6, 7, 8, and 9, the front and rear subassemblies of each of the wheeled cradles 110 are held together by a pair of adjustable fasteners such as threaded bolts 132, with the front longitudinal members 114 slidably and telescopically mated with the rear longitudinal members 116 of each carrier 110. A head of each bolt 132 is accessible at the rear of each cradle 110, and a block 134 defining an interior thread is fixedly located within the rear end of a front longitudinal member 114 to receive matingly the threaded portion of the bolt 132, and thus to pull the front and rear portions of the wheeled cradle 110 together.

Figure 7:
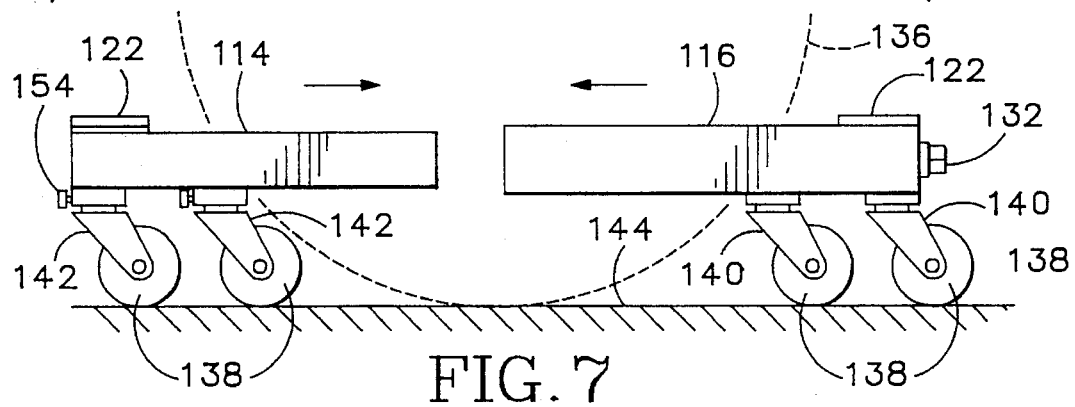
FIG. 7 is an elevational view, taken in the direction indicated by the line 7—7 in FIG. 6, showing the wheeled cradle with its front and rear subassemblies separated from each other with a part of a motor vehicle wheel shown in broken line.
Figure 8:
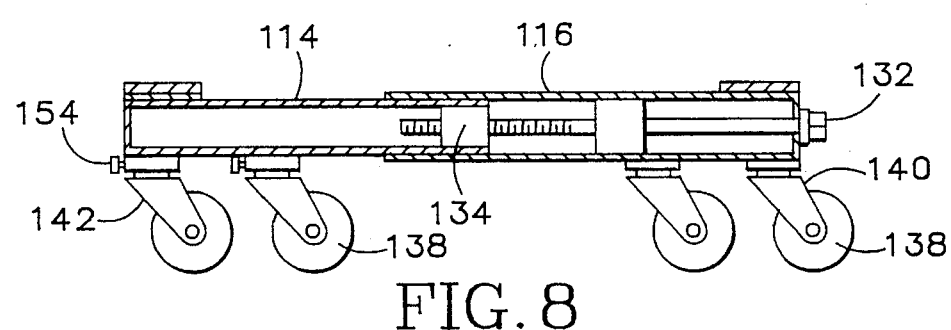
FIG. 8 is a sectional view, taken along line 8—8 of FIG. 6, showing the mechanism by which the front and rear subassemblies of the cradle are interconnected with each other.
Figure 9:
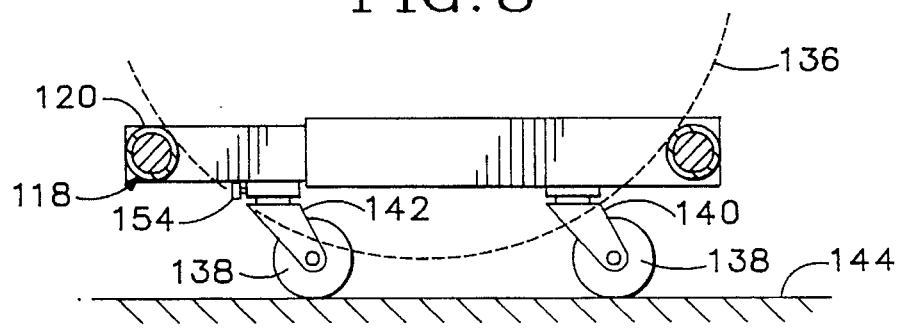
FIG. 9 is a sectional view, taken along line 9—9 of FIG. 6, showing in broken line the position of a motor vehicle wheel supported by the cradle.

As shown in FIG. 7, the front and rear subassemblies of a wheeled cradle 110 may be separated from each other, so that the front subassembly 112, for example, can be placed in front of a pair of the usual wheels 136 at one end of a wheeled vehicle such as an automobile, while the rear subassembly is placed behind the wheels. The tire engaging members 118 can be brought to bear against the respective peripheral surfaces of the tire on each wheel 136 to raise the wheel, as shown in FIG. 9.

Each of the two subassemblies of the cradle 110 is supported by four small wheels 138, each wheel being part of a respective caster 140 or 142. Preferably two of the casters 140 or 142 of each subassembly are mounted on the bottom of the respective one of the transverse members 112 or 113, while the other two are spaced apart from the others longitudinally of the respective cradle subassembly and are attached to the bottoms of respective ones of the longitudinal members 114 or 116. Each of the two separate subassemblies of the cradle 110 is stable and self-supporting, with the front and rear longitudinal portions 114 and 116 in a horizontal attitude, that is, parallel with a planar surface 144 on which the cradle 110 is resting. The front longitudinal members 114 thus can easily be inserted into the open ends of the rear longitudinal members 116 by moving the two subassemblies of the cradle 110 as indicated by the arrows in FIG. 7 once they are arranged facing each other on opposite sides of a pair of wheels 136.

Once the front and rear subassemblies of the cradle 110 have thus been mated, the bolts 132 are turned equally to draw the front longitudinal members 114 further into the rear longitudinal members 116. This action brings the tire engaging members 118 closer together against the peripheral surfaces of the tires on the vehicle wheels 136 and, ultimately, raises the wheels 136 above the surface 144. One of the cradles 110 is used separately to support each end of a wheeled vehicle, such as an automobile 26 or 28, to be carried in accordance with the present invention.

As shown best in FIG. 4, each of the support brackets 122 defines a hole 146, and a rear stop 148 includes a pair of pins 150 and 152 spaced apart from each other by a distance equal to the spacing between consecutive ones of the holes 126 in each of the flanges 124. The stops 148 can be placed on a flange 124 to prevent movement of a cradle longitudinally along the flanges 124 merely by insertion of the pin 150 into an appropriate one of the holes 126 in each flange 124. However, each of the pins 152 should also be inserted into a respective hole 146 and thence further downward into a corresponding hole 126 in each flange 124, so that the cradle 110 interconnects the two upper longitudinal vehicle-support members 62, to prevent lateral movement of the vehicle support members 62 relative to each other. The rear stop 148 is therefore intended to be used with the one of a pair of cradles 110 that supports the end of a wheeled vehicle 26 located closer to the rear end 83 of the rack 24. A locking pin 130 is preferably provided to mate with a hole in the pin 150 to retain the rear stop 148 in position.

The casters 142 include selectively engageable stops such as locking pins 154 which can be engaged when the casters 142 are oriented in a straight-ahead direction, parallel with the front longitudinal members 114, to prevent each of the casters 142 from swiveling with respect to the cradle 110. The casters 140, however, are free to swivel about a generally upright swivel axis, as indicated by the arrow 156.

Figure 10:
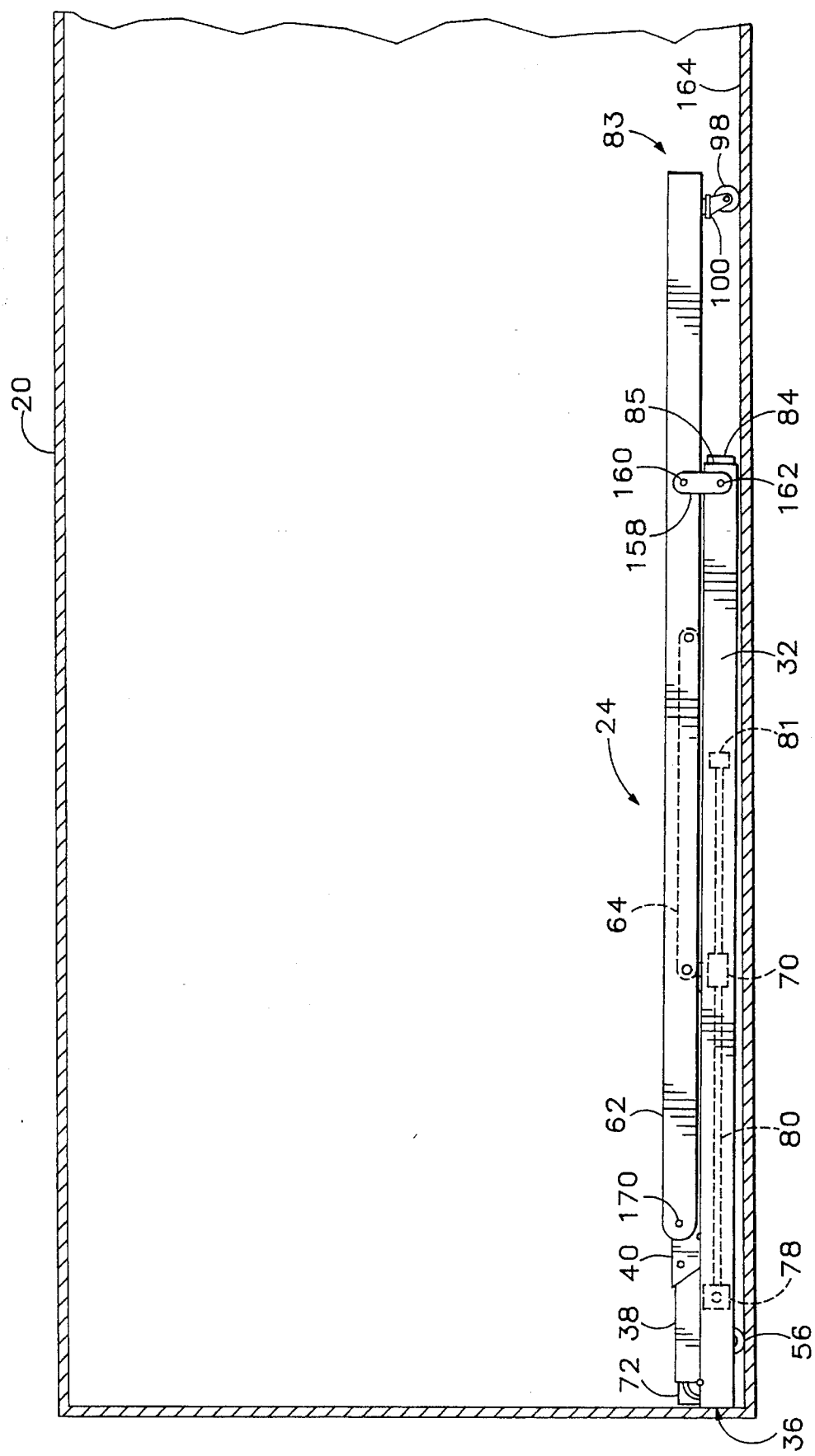
FIG. 10 is a side sectional view of a portion of a cargo container containing a vehicle supporting apparatus embodying the present invention in its collapsed configuration.
Figure 11:
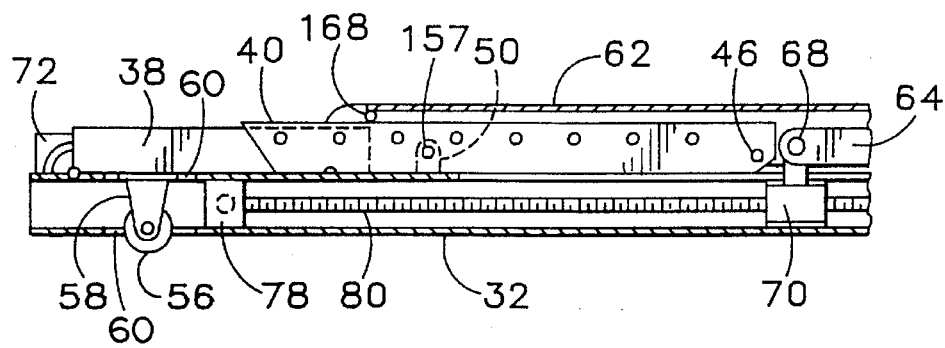
FIG. 11 is a sectional view of a portion of the apparatus taken along the line 3—3 shown in FIG. 2, but with the collapsible upright support subassembly in the fully lowered configuration shown in FIG. 10.

As shown in FIG. 10, the rack 24 can be folded down to a collapsed configuration, in which the upright support members 38 and the inclined support members 40 lie in respective lowered positions atop and parallel with the respective base longitudinal members 32. The base 30 is raised slightly using the upright support member 38 as a lever as by stepping on it, until the wheels 56 protrude downward beneath the base longitudinal members 32 raising the front end 36 of the apparatus. A respective one of the pins 45 is placed through holes 157 defined in each inclined support member 40 and through the hole 48 in the respective ear 50 to keep each upright support member 38 close to the respective base longitudinal member 32 so that the wheels 56 continue to support the front end 36 of the apparatus. The front portion of each upper longitudinal vehicle support member 62 is nestled around a portion of the respective inclined member 40, as may be seen somewhat more clearly in FIG. 11.

Near the rear end 83 a link plate 158 (FIG. 10) is attached to each of the upper longitudinal vehicle support members 62 by a respective bolt 160 and extends downward alongside the related base longitudinal member 32. A pin 162 extends removably through a hole defined in the link plate 158, thence through a corresponding hole defined in the base longitudinal member 32, and further through a selected one of the locating holes 86 in the base extension member 84 associated with the rear end 85 of the base longitudinal member 32. The pin 162 thus attaches the base longitudinal member 32 closely to the bottom of the upper longitudinal vehicle support member 62.

The caster assembly 100 is taller than the base longitudinal support members 32. As a result, when the upper longitudinal vehicle support members 62 are atop the base longitudinal support members 32 and the pin 162 is in place, holding the rear end 85 of the base longitudinal support member 32 close to the upper longitudinal vehicle support member 62, the wheel 98 supports the rear end 83 of the rack 24, with the extension member 84 and the rear end 85 of the base longitudinal support member 32 clear of a generally planar substantially horizontal surface, such as the floor 164 of the container 20, on which the wheel 98 is resting.

OPERATION

With the upright member 38 in its lowered position atop the base longitudinal member 32 as shown in FIG. 10, the pedestal 58 extends downward through the passageway provided by the openings 60, and at least part of the wheel 56 is located beneath the base longitudinal member 32, resting on a generally planar substantially horizontal surface such as the floor 164 and supporting the front end 36 of the base 30 of the rack 24 a small distance above the floor 164. Thus, in the collapsed configuration illustrated in FIG. 10, the rack 24 may be wheeled into a desired position within the interior of the container 20. The rack 24 is steered by lateral movement of the rear end 83, accommodated by swiveling of the caster assemblies 100 through which the rear wheels 98 support the rear end 83, while the wheels 56, not being free to swivel, guide the front end 36 of the rack in a straight-ahead direction parallel with the orientation of the base longitudinal members 32 at any particular time except as allowed by such swiveling of the casters 100.

Once the rack 24 is located in a desired position to receive vehicles 26 and 28, such as within the container 20, the pin 162 is withdrawn from the link plate 158. This allows the rear end 85 of each base longitudinal member 32 to descend to rest upon the floor 164, keeping the base longitudinal members 32 thereafter in the selected location within the container 20.

Next, the drive transmission 72 is operated, either by using a manual crank 166, or preferably, by connecting an externally powered rotary drive mechanism, such as a flexible shaft drive (not shown) to the drive transmission 72, and rotating the drive transmission 72 in the appropriate direction to cause the rotation of the threaded shafts 80 to move the movable bearing assemblies 70 toward the rear end 83. This rearward movement, transmitted through the struts 64, moves the upper longitudinal vehicle support members 62 rearward, so that the inclined member 40 may be disengaged from beneath the front end of each, by withdrawing the pin 45 from the holes 157 and 48. This allows the front portion of the base 30 to move down to rest on the floor 164.

Figure 3:
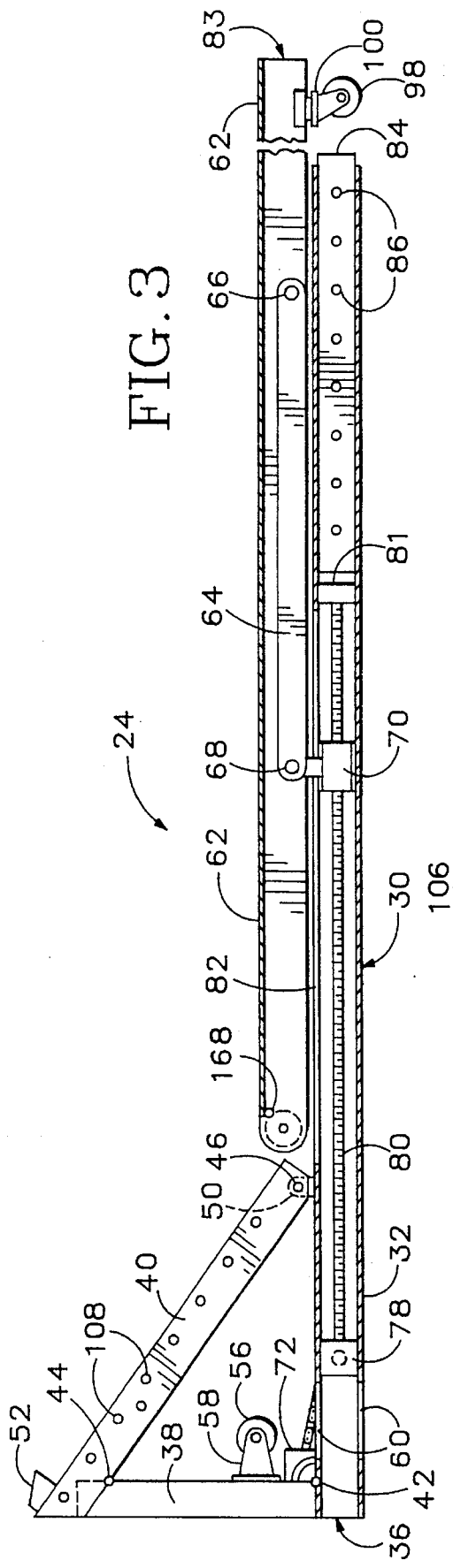
FIG. 3 is a sectional side view of the apparatus shown in FIG. 2, taken along line 3—3.
Figure 12:
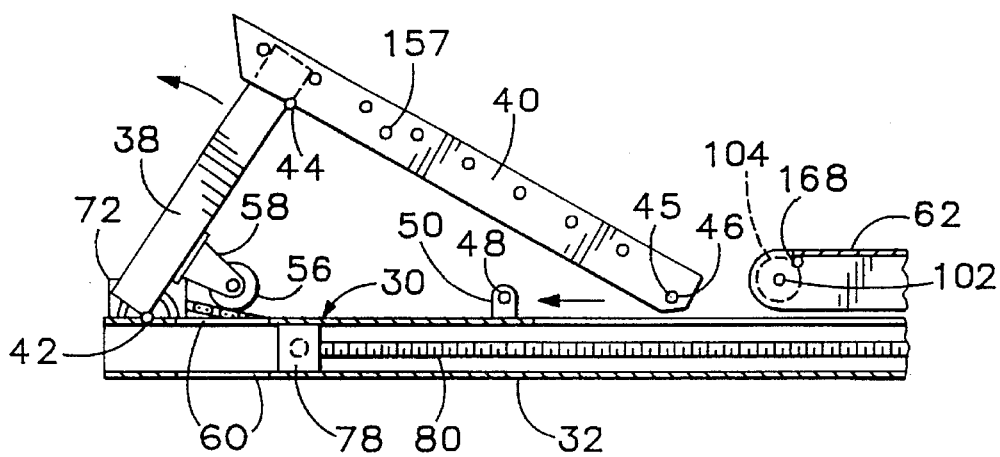
FIG. 12 is a sectional view of a portion of the vehicle-supporting apparatus shown in FIG. 2, taken along line 3—3, with a collapsible upright support subassembly in a partially lowered configuration.
Figure 14:
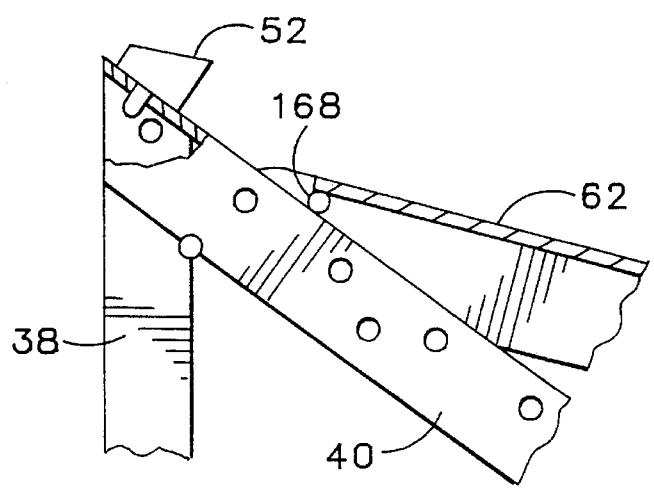
FIG. 14 is a detail view of the upper portions of a collapsible upright support subassembly of the vehicle-supporting apparatus shown in FIG. 13, with the upper longitudinal vehicle-support members in an intermediate position along the inclined support member during the procedure of raising or lowering the upper longitudinal vehicle-support members.

Next, the collapsible upright support subassemblies are each erected by moving the upright member 38 and the inclined support member 40 in the directions indicated by the arrows in FIG. 12, until the upright member 38 and inclined member 40 pivot about the hinges 42 and 44 to the positions shown in FIG. 3. A fastener such as the locking pin 45 is placed through the holes 46 and 48 defined respectively in the inclined member 40 and the ear 50 to retain the upright support subassemblies in this erect configuration.

Figure 13:
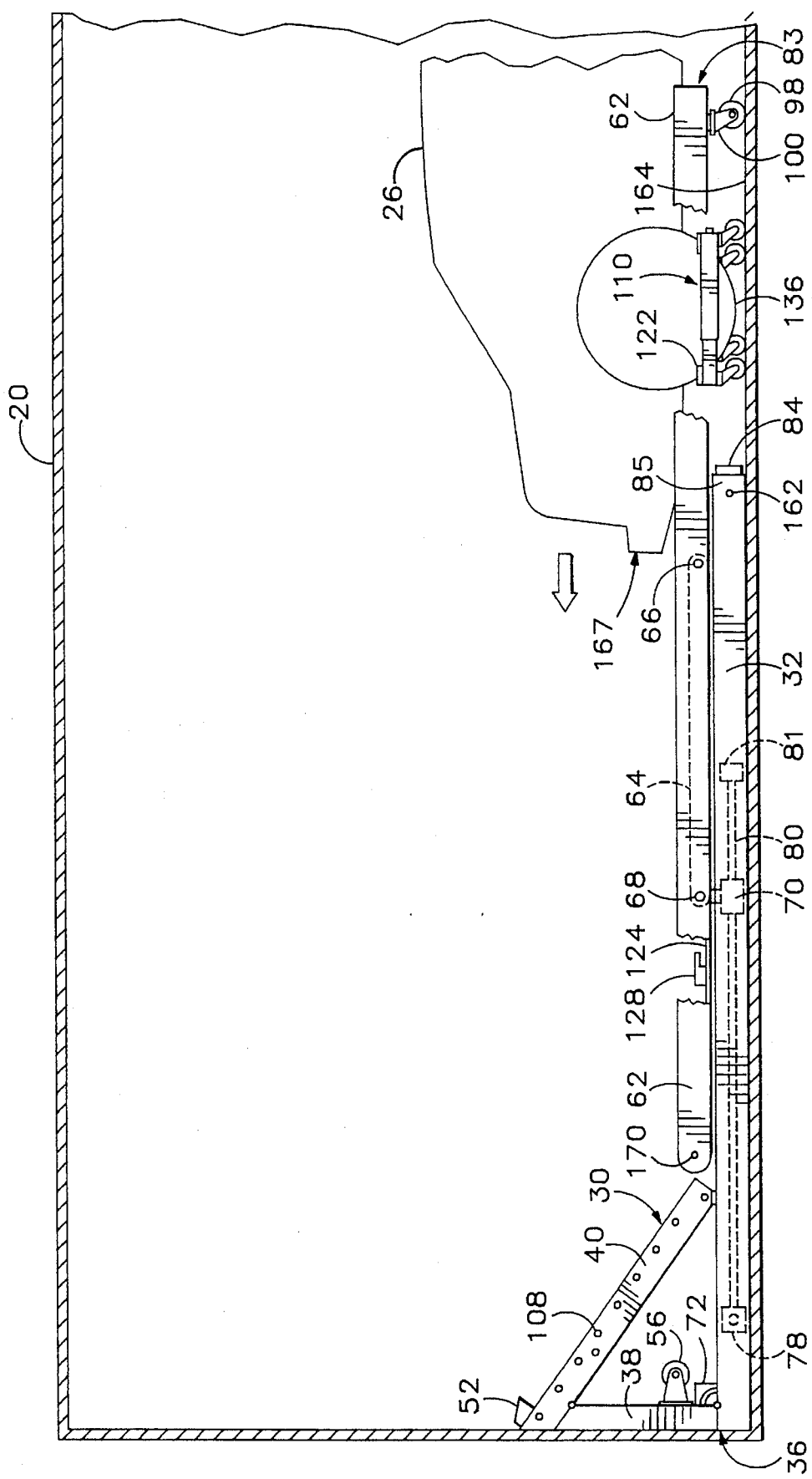
FIG. 13 is a side sectional view of a portion of a cargo container containing a vehicle supporting apparatus embodying the present invention, together with a portion of an automobile being moved into position to be attached to the upper longitudinal support members of the apparatus.

The transmission 72 is then operated in the opposite direction to return the upper longitudinal vehicle support members 62 to the position shown in FIG. 13, and the front stops 128 are placed on the flanges 124 of the upper longitudinal vehicle support members in a precalculated position near the front end of the rack 24. This places the rack 24 in a vehicle-receiving configuration, ready to receive the automobile 26 to be carried in the upper tier position.

With the automobile 26 carried on two cradles 110 and with at least one of the casters 142 on the cradle 110 supporting the rear end 167 of the automobile 26 locked in a straight-ahead position, as by engaging the locking pin 154, the automobile 26 is made ready to be loaded upon the rack 24. Steering the automobile 26 by moving the front end of the automobile laterally, allowing the casters 140 and 142 supporting one of the cradles 110 to swivel, the automobile is steered and pushed rear-end-first into a position in which the two cradles 110 supporting it are located between the two upper longitudinal vehicle support members 62, as shown (without the automobile) in FIG. 2.

When the support brackets 122 of the cradle 110 supporting the rear end of the automobile 26 contact the front stops 128, the rear stops 148 are inserted into the appropriate locator holes 126. The position of the automobile 26 and the cradles 110 supporting it are adjusted as necessary to allow both of the pins 150 and 152 of each rear stop 148 to be fully inserted through the holes 146 of the rearward (with respect to the rack 24) support brackets 122 of the cradle 110 supporting the front end of the automobile 26, and into the respective locator holes 126. The front stops 128 and rear stops 148 thus fix the position of the automobile 26 longitudinally with respect to the upper longitudinal vertical support members 62 while at the same time the cradle 110 nearer the rear end 83 of the rack 24 maintains the lateral spacing between rear ends of the upper longitudinal vehicle support members 62.

With the stop 52 of each collapsible upright support subassembly located in a predetermined position with its pin in a selected one of the holes 54 of the inclined support member 40, and with the automobile 26 attached to the upper longitudinal vehicle support members 62 as described above, the drive transmission 72 is operated to move the movable bearing assemblies 70 toward the front end 36 of the rack. The pivot bearings 68 pull the struts 64 and through them the upper longitudinal vehicle support members 62, bringing the front ends of the upper longitudinal vehicle support members 62 toward the inclined members 40.

Figure 15:
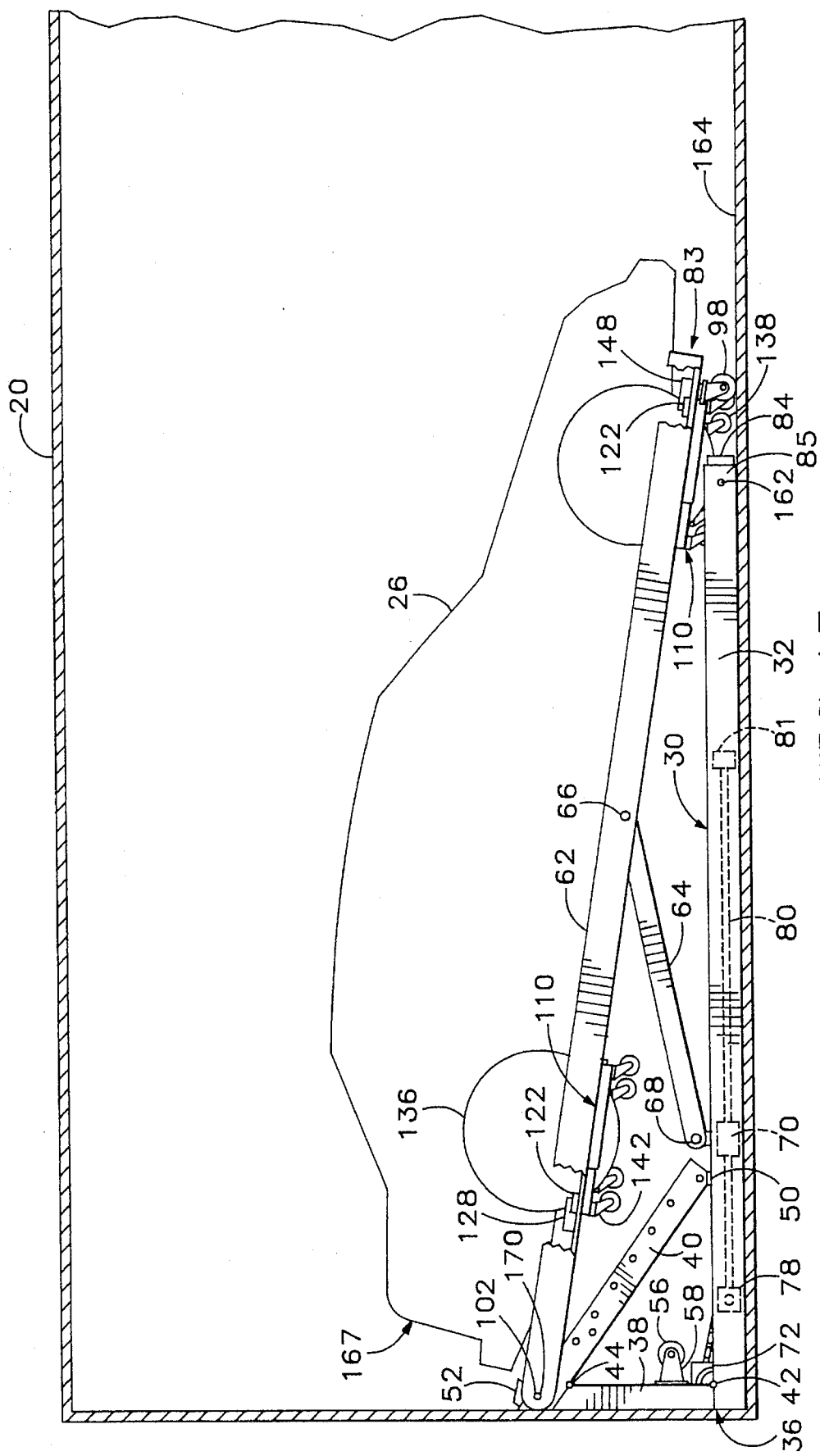
FIG. 15 is a view similar to FIG. 13, showing a vehicle supported by the upper longitudinal vehicle-support members, with the upper longitudinal vehicle-support members located with a first end thereof in a raised position within the cargo container.

The solenoids 104 are then actuated to retract the locking pins 102, and the drive transmission 72 is operated further to draw the front end of the upper longitudinal vehicle support members 62, carrying the automobile 26 upward along the inclined member 40. A bearing member 168, which may be a suitably hard rod extending transversely at the front end of the support member 62, rides along the top face of the inclined member 40. The flanges 124 assume the weight of the automobile 26 and the cradles 110 which support it while the upper longitudinal vehicle support members 62 are supported by the inclined members 40 and by the wheels 98. When the front ends of the upper longitudinal vehicle support members 62 encounter the stops 52 as shown in FIG. 15, the locking pins 102 of the upper longitudinal vehicle support members 62 are aligned with the appropriate one of the transverse holes 108. The solenoids 104 are then deactuated, allowing the associated springs to extend the locking pins 102 through the transverse holes 108 and through the corresponding holes 170 in the side of each support member 62 opposite the solenoids. The front ends of the upper longitudinal vehicle support members 62 are thus securely fastened to the inclined members 40 and free to pivot about the locking pin 102 in a vertical plane, but held at the correct lateral spacing by the collapsible upright support subassemblies. The rear ends of the upper longitudinal vehicle support members 62 remain supported by the wheels 98 resting on the floor 164 of the container 20.

The drive transmission 72 is thereafter operated in the direction required to translate the movable bearing assemblies 70 along the base longitudinal members 32 toward their rear ends 85, subjecting the struts 64 to compressive loading. As the movable bearing assemblies 70 are moved rearward the struts 64 rotate counterclockwise, as viewed in FIG. 15, and the struts 64 raise the rear ends of the upper longitudinal vehicle support members 62 above the floor 164, ultimately to the position shown in FIG. 16 or to a higher or lower position as required by the size of the automobile 26 and the height of the available space within the container 20. An automobile 26 can thus be raised to an upper tier position extending into an upper part of the container 20, even though the height of a doorway opening of the container 20 may be limited as by a structural member 165 (FIG. 1). Thereafter, the flexible shaft, if any, is disconnected from the drive transmission 72 and the drive transmission 72 may be locked, if desired, to prevent movement of the threaded shafts 80.

The weight of the upper automobile 26 is then fully supported by the rack 24, keeping it firmly weighted down against the floor 164 of the container 20. The base extension members 84 are then extended far enough to keep the front end 36 of another rack 24 far enough away to avoid contact with the lower automobile 28, and to keep the rack 24 in place in the container 20, and the pin 162 is inserted through the holes in the base longitudinal members 32 near the rear end 85 of the base longitudinal members 32 to engage the appropriate hole 86 in the extension member 84.

Once the automobile 26 has been raised as described above, the automobile 28, carried on a pair of wheeled cradles 110 in the same manner as was the automobile 26, is moved into position to be fastened to the rack 24, as shown in FIG. 16. The casters 142 of the cradle 110 supporting the front end 172 of the automobile 28 are locked, but the rear end of the automobile 28 can be moved laterally by swiveling the casters 140 and 142 of the other cradle 110 to steer the automobile 28 properly into position between the base longitudinal members 32. A pair of front stops 128', similar to the stops 128, but higher because of the location of the flange 125 lower than the flange 124, are placed appropriately on the flanges 125 of the base longitudinal members 32 to establish the desired position of the automobile 28 in the lower position in the rack 24.

The automobile 28 is moved forward until the cradle 110 supporting its front end 172 encounters the front stops 128', and a pair of rear stops 148', similar to but taller than the stops 148, are then inserted into the appropriate holes 127 in the flange 125. Depending upon the length of the automobile 28, the stops 148' may need to be inserted into the brackets 122 located on the side of the rearward cradle 110 which is closer to the front end 36 of the rack 24. The front and rear stops 128' and 148' thus keep the lower automobile 28 from moving forward or rearward with respect to the rack 24, although the wheels 138 of the casters 140 and 142 of the cradles 110 continue to support the weight of the lower automobile 28 on the floor 164 of the container 20.

An additional rack 24 may then be placed into position adjacent the rack 24 supporting the automobiles 26 and 28, by moving it in its collapsed configuration, as explained previously, allowing a second pair of automobiles 26 and 28 to be loaded into the container 20.

Depending upon the size of the container 20, and the size of the automobiles to be carried, one rack 24 can be accommodated readily within a standard 20-foot-long intermodal cargo container, two of the racks 24 can be accommodated within a 40-foot container, and three of such racks 24 can be accommodated within a 48' or 53-foot long container 20. Appropriate placement of the base extension members 84 will prevent any of the racks 24 from moving longitudinally within the container 20 and thereby will prevent damage to any of the automobiles carried on any of the racks 24.

Unloading automobiles from the container 20 is accomplished essentially by the reverse of the operation of loading them into the container 20. Unloading does not require any special facilities, other than the availability of a level loading platform which substantially matches the height of the container floor 164.

Since automobiles are frequently shipped in large numbers in only one direction along a particular route, without a corresponding number of automobiles being shipped in the opposition direction, a relatively large number of empty racks 24 may accumulate at the destination where the automobiles 26 and 28 are unloaded. By returning each of the racks 24 to the collapsed configuration shown in FIG. 10, however, several of the racks 24 may be stowed within the space originally occupied by only one rack 24 carrying a pair of automobiles 26 and 28. As a result, all of the racks 24 used to transport automobiles in several containers 20 can be contained within a single container 20 during return shipment, leaving the remainder of those other containers 20 available to carry other cargo and thus earn freight rather than having to be transported back to the origin of the automobiles empty.

Since each automobile 26 or 28 is moved into the container 20 and attached to the rack 24 without the need for a person to enter the automobile, it is not necessary for a person to attempt to exit from the automobile within the confined space within the container 20, and the likelihood of damage to automobiles carried on the rack 24 is thus reduced.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for supporting a wheeled vehicle, comprising:

(a) moving a rack along a generally planar surface with said rack in a collapsed configuration, to a predetermined location;

(b) placing said rack, supported by said generally planar surface, in a vehicle receiving configuration;

(c) thereafter moving a wheeled vehicle separately along said generally planar surface into a predetermined location with respect to said rack, with said wheeled vehicle supported at least in part by a wheeled cradle supported by said generally planar surface and engaging a wheel of said wheeled vehicle; and (d) fastening said wheeled vehicle to said rack by interconnecting said wheeled cradle with said rack.

2. The method of claim 1 wherein said step of placing said rack in said vehicle-receiving configuration includes erecting a collapsible vertical support subassembly at a first end of said rack.

3. The method of claim 1 wherein said step of interconnecting said wheeled cradle with said rack includes fastening said cradle to an upper longitudinal support member, the method including the further steps of raising said upper longitudinal support member and thereby raising said wheeled vehicle to an upper tier position.

4. The method of claim 3, further including the steps of moving a second wheeled vehicle into a second predetermined location with respect to said rack, said second predetermined location being beneath said wheeled vehicle in said upper tier position and said second wheeled vehicle being supported at least in part by a further wheeled cradle supported by said generally planar surface and engaging a wheel of said second wheeled vehicle; and fastening said second wheeled vehicle to said rack by interconnecting said further wheeled cradle with said rack.

5. A method for supporting a wheeled vehicle, comprising:

(a) moving a rack to a predetermined location, using wheels attached to said rack and supporting said rack with said rack in a collapsed configuration;

(b) placing said rack in a vehicle-receiving configuration, including moving said wheels attached to said rack to a raised position and thereby lowering a first end of said rack to a supporting surface;

(c) moving a wheeled vehicle into a predetermined location with respect to said rack, with said wheeled vehicle supported at least in part by a wheeled cradle engaging a wheel of said wheeled vehicle; and (d) fastening said wheeled vehicle to said rack by interconnecting said wheeled cradle with said rack.

6. A method of moving a wheeled vehicle into an upper transport position providing space for another such vehicle beneath said upper transport position, comprising:

(a) providing a vehicle support rack including a horizontal base having a pair of upper longitudinal support members;

(b) attaching a vehicle to said pair of upper longitudinal support members;

(b) moving said pair of upper longitudinal support members longitudinally relative to said base, in a first direction, thereby moving a first end of each of said upper longitudinal support members up a respective inclined surface of an inclined support member carried on said base to a predetermined height above said base;

(c) attaching said first end to a pivot connection located on said inclined support member at said predetermined height above said base; and (d) thereafter raising a second end of each of said upper longitudinal support members while allowing said first end to pivot about said pivot connection.

7. The method of claim 6 wherein said rack includes a pair of lower horizontal longitudinal members and said step of raising said second end of each of said upper longitudinal support members includes connecting a first end of each of a pair of support struts to a respective one of said lower horizontal longitudinal members, connecting a second end of each of said pair of support struts to a respective one of said upper longitudinal support members, and thereafter moving said first ends of both of said support struts simultaneously, each along said lower horizontal longitudinal member to which each is connected, while causing said second ends of said support struts to pivot about a respective location fixed with respect to said upper longitudinal members to which said second ends are connected, thereby moving said support struts toward an upright orientation between said lower horizontal longitudinal members and said upper longitudinal support members until said support struts support said upper longitudinal support members in a desired orientation and at a desired height above said lower horizontal longitudinal members.

8. A method for placing a two-tier vehicle-support apparatus into a desired location and into a load-receiving configuration, comprising:

(a) placing said vehicle-support apparatus into a collapsed configuration, by placing a collapsible subassembly into a lowered position;

(b) with said vehicle-support apparatus in said collapsed configuration, supporting a front end thereof on a wheel mounted on a member of said collapsible subassembly;

(c) supporting a rear end of said apparatus, while moving said apparatus to a predetermined location in said collapsed configuration, with said front end of said apparatus supported on said wheel;

(d) thereafter moving said member of said collapsible subassembly upward relative to a base of said apparatus and thereby raising said wheel with respect to said base until said wheel no longer supports said front end of said apparatus.

9. The method of claim 8 wherein said step of supporting said rear end of said apparatus includes supporting a rear end of said base on a caster, said method including the further step of lowering said base from a position in which it is supported by said caster after moving said apparatus to said predetermined location.

10. The method of claim 8, wherein said apparatus includes an upper longitudinal member having a caster supportingly attached thereto, and wherein said step of supporting said rear end of said apparatus includes the step of supporting a rear end portion of said base on said caster by releasably connecting said rear end portion of said base to said upper longitudinal member.

11. A method for loading a wheeled vehicle into an intermodal cargo container, comprising:

(a) moving a rack along a generally planar surface to a predetermined location inside an intermodal cargo container;

(b) thereafter, placing said rack into a vehicle-receiving configuration;

(c) thereafter, supporting a wheeled vehicle at least in part by a separate and independent wheeled cradle engaging a wheel of said wheeled vehicle, and moving said wheeled vehicle along said generally planar surface into a predetermined location with respect to said rack; and (d) thereafter fastening said wheeled vehicle to said rack by interconnecting said wheeled cradle with said rack.

12. The method of claim 11 wherein said step of placing said rack in said vehicle receiving configuration includes erecting a collapsible vertical support subassembly at a first end of said rack, by raising a member of said vehicle support subassembly from a generally horizontal collapsed configuration to an upright position prior to fastening said wheeled vehicle to said rack.

13. The method of claim 11 wherein said step of interconnecting said wheeled cradle with said rack includes fastening said cradle to an upper longitudinal support member and wherein said method includes the further step of raising said upper longitudinal support member, thereby raising said wheeled vehicle to an upper tier position.

14. The method of claim 13, including the further steps of moving a second wheeled vehicle into a second predetermined location with respect to said rack while said rack is located within said intermodal cargo container, said second predetermined location being beneath said wheeled vehicle in said upper tier position, and said second wheeled vehicle being supported at least in part by a further wheeled cradle engaging a wheel of said second wheeled vehicle; and fastening said second wheeled vehicle to said rack by interconnecting said further wheeled cradle with said rack.

15. A method for loading a wheeled vehicle into an intermodal cargo container, comprising:

(a) moving a rack to a predetermined location inside an intermodal cargo container, using wheels attached to said rack to support said rack with said rack in a collapsed configuration while moving said rack;

(b) placing said rack into a vehicle-receiving configuration;

(c) thereafter, with a wheeled vehicle supported at least in part by a wheeled cradle engaging a wheel of said wheeled vehicle, moving said wheeled vehicle into a predetermined location with respect to said rack; and (d) fastening said wheeled vehicle to said rack by interconnecting said wheeled cradle with said rack.

16. The method of claim 15 wherein said step of placing said rack into said vehicle-receiving configuration includes moving said wheels attached to said rack to a raised position and thereby lowering a first end of said rack to a supporting surface within said intermodal cargo container.

* * * * *